(12) United States Patent  (10) Patent No.: US 7,232,626 B2
Jacobson et al.  (45) Date of Patent: Jun. 19, 2007

(54) PLANAR ELECTROCHEMICAL DEVICE ASSEMBLY

(75) Inventors: Craig P. Jacobson, Lafayette, CA (US); Steven J. Visco, Berkeley, CA (US); Lutgard C. De Jonghe, Lafayette, CA (US)

(73) Assignee: The Regents of the University of California, Oakland, CA (US)

(*) Notice: Subject to any disclaimer, the term of this patent is extended or adjusted under 35 U.S.C. 154(b) by 330 days.

(21) Appl. No.: 10/423,472

(22) Filed: Apr. 24, 2003

(65) Prior Publication Data

US 2004/0115503 A1 Jun. 17, 2004

Related U.S. Application Data

(60) Provisional application No. 60/449,095, filed on Feb. 20, 2003, provisional application No. 60/375,515, filed on Apr. 24, 2002.

(51) Int. Cl.
*H01M 4/00* (2006.01)
*H01M 8/00* (2006.01)
*H01M 8/10* (2006.01)
*H01M 2/02* (2006.01)

(52) U.S. Cl. ................... 429/128; 429/12; 429/30; 429/34

(58) Field of Classification Search ............... 429/12, 429/30, 34, 128
See application file for complete search history.

(56) References Cited

U.S. PATENT DOCUMENTS

| | | | |
|---|---|---|---|
| 4,728,584 A | 3/1988 | Isenberg | |
| 4,774,153 A | 9/1988 | Sterzel | |
| 5,035,962 A | 7/1991 | Jensen | |
| 5,160,090 A | 11/1992 | Friedrich et al. | |
| 5,160,618 A | 11/1992 | Burggraaf et al. | |
| 5,169,811 A | 12/1992 | Cipollini et al. | |
| 5,219,673 A | 6/1993 | Kaun | |
| 5,240,480 A | 8/1993 | Thorogood et al. | |
| 5,286,322 A | 2/1994 | Armstrong et al. | |
| 5,314,765 A | 5/1994 | Bates | |
| 5,328,779 A | 7/1994 | Tannenberger et al. | |
| 5,338,625 A | 8/1994 | Bates et al. | |

(Continued)

FOREIGN PATENT DOCUMENTS

| | | |
|---|---|---|
| EP | 399833 A1 | 11/1990 |
| EP | 0476808 | 3/1992 |
| EP | 0497542 | 8/1992 |

(Continued)

OTHER PUBLICATIONS

Yao, et al., Sensors and Actuators A 71, Received Dec. 9, 1997; received in revised form Apr. 27, 1998; accepted May 1, 1998, pp. 139-143.

(Continued)

*Primary Examiner*—Dah-Wei Yuan
(74) *Attorney, Agent, or Firm*—Fulbright & Jaworski L.L.P.

(57) ABSTRACT

A pre-fabricated electrochemical device having a dense electrolyte disposed between an anode and a cathode preferably deposited as thin films is bonded to a porous electrically conductive support. A second porous electrically conductive support may be bonded to a counter electrode of the electrochemical device. Multiple electrochemical devices may be bonded in parallel to a single porous support, such as a perforated sheet to provide a planar array. Planar arrays may be arranged in a stacked interconnected array. A method of making a supported electrochemical device is disclosed wherein the method includes a step of bonding a pre-fabricated electrochemical device layer to an existing porous metal or porous metal alloy layer.

12 Claims, 5 Drawing Sheets

U.S. PATENT DOCUMENTS

| | | | |
|---|---|---|---|
| 5,342,705 A | 8/1994 | Minh et al. | |
| 5,342,710 A | 8/1994 | Koksbang | |
| 5,356,730 A | 10/1994 | Minh et al. | |
| 5,366,770 A | 11/1994 | Wang | |
| 5,455,126 A | 10/1995 | Bates et al. | |
| 5,458,989 A | 10/1995 | Dodge | |
| 5,480,739 A | 1/1996 | Kawasaki et al. | |
| 5,509,942 A | 4/1996 | Dodge | |
| 5,512,147 A | 4/1996 | Bates et al. | |
| 5,532,071 A | 7/1996 | Pal et al. | |
| 5,538,814 A | 7/1996 | Kamauchi et al. | |
| 5,549,983 A | 8/1996 | Yamanis | |
| 5,567,210 A | 10/1996 | Bates et al. | |
| 5,569,520 A | 10/1996 | Bates | |
| 5,589,017 A | 12/1996 | Minh | |
| 5,589,285 A | 12/1996 | Cable et al. | |
| 5,597,660 A | 1/1997 | Bates et al. | |
| 5,612,152 A | 3/1997 | Bates | |
| 5,648,487 A | 7/1997 | Beriger et al. | |
| 5,670,270 A | 9/1997 | Wallin | |
| 5,686,201 A | 11/1997 | Chu | |
| 5,725,965 A | 3/1998 | Wachsman et al. | |
| 5,788,788 A | 8/1998 | Minh | |
| 5,814,420 A | 9/1998 | Chu | |
| 5,824,434 A | 10/1998 | Kawakami et al. | |
| 5,882,809 A | 3/1999 | McPheeters et al. | |
| 5,922,486 A * | 7/1999 | Chiao | 429/32 |
| 5,932,368 A | 8/1999 | Batawi et al. | |
| 5,938,822 A | 8/1999 | Chen et al. | |
| 5,985,476 A | 11/1999 | Wachsman et al. | |
| 5,993,985 A | 11/1999 | Borglum | |
| 5,993,986 A | 11/1999 | Wallin et al. | |
| 6,007,683 A * | 12/1999 | Jankowski et al. | 204/192.17 |
| 6,025,094 A | 2/2000 | Visco et al. | |
| 6,051,173 A | 4/2000 | Fasano et al. | |
| 6,051,330 A | 4/2000 | Fasano et al. | |
| 6,228,520 B1 | 5/2001 | Chaio | |
| 6,344,426 B1 * | 2/2002 | Hata et al. | 501/103 |
| 6,358,567 B2 | 3/2002 | Pham et al. | |
| 6,368,383 B1 | 4/2002 | Virkar et al. | |
| 6,458,170 B1 | 10/2002 | Visco et al. | |
| 6,767,662 B2 * | 7/2004 | Jacobson et al. | 429/30 |
| 6,794,075 B2 * | 9/2004 | Steele et al. | 429/30 |
| 2001/0012576 A1 | 8/2001 | Christiansen | |
| 2002/0048699 A1 | 4/2002 | Steele et al. | |

FOREIGN PATENT DOCUMENTS

| | | |
|---|---|---|
| EP | 0513982 | 11/1992 |
| EP | 0524013 | 1/1993 |
| EP | 0 111 214 | 1/1998 |
| GB | 1 383 343 A | 12/1974 |
| GB | 2 339 063 A | 1/2000 |
| JP | 10-251750 * | 9/1998 |
| JP | 2002-289249 | 10/2002 |
| WO | WO 97 00734 A | 9/1997 |
| WO | WO 98/50975 | 11/1998 |
| WO | WO 02/35628 A1 | 5/2002 |

OTHER PUBLICATIONS

Fujii, K., et al., Bulletin of the Electrotechnical Laboratory, vol. 62, No.1-2, 1998, pp. 1319.

Momma, et al., Electrochemical Laboratory, Electrochemical Proceedings vol. 97-40, Jun. 1997, pp. 310-321.

Okuo, et al., Electrotechnical Laboratory, Oct. 1994, pp. 908-919.

Okua, T., et al., vol. 60, No. 5, 1996 pp. 1-9.

Schiller, G., et al., Electrochemical Society Proceedings vol. 99-19, Oct. 1999, pp. 892-903.

Schiller, G., et al., Electrochemical Proceedings vol. 97-40, Oct. 1999, pp. 634-645.

Schiller, G., et al., 1998, pp. 515-518.

Takenoiri, et al., Fuel Cell Seminar Abstracts, Nov. 1998, pp. 84-87.

Unal, et al., Department of Materials Science and Engineering, vol. 984-92, 1994, pp. 984-992.

Wallin et al., "Confined Solid Oxide Fuel Cells for Operation at 800° C" 1997, Abstract only.

Seabaugh, et al., NexTech Materials, Ltd.; Fuel Cells 2000 Conference in Portland OR. Oct. 30, 2000-Nov. 2, 2000.

Iconell 600 Trade Data Sheet—www.hpalloy.com/Data Sheets/600.html Jun. 5, 2002—Note: Probably posted on web earlier.

* cited by examiner

PLANAR ELECTROCHEMICAL DEVICE ASSEMBLY

CROSS-REFERENCE TO RELATED APPLICATIONS

This application claims priority from U.S. provisional application Ser. No. 60/449,095 filed on Feb. 20, 2003, incorporated herein by reference, and from U.S. provisional application Ser. No. 60/375,515 filed on Apr. 24, 2002, incorporated herein by reference.

STATEMENT REGARDING FEDERALLY SPONSORED RESEARCH OR DEVELOPMENT

This invention was made with government support under Grant (Contract) No. DE-AC03-76F00098 awarded by the United States Department of Energy. The government has certain rights to this invention.

INCORPORATION-BY-REFERENCE OF MATERIAL SUBMITTED ON A COMPACT DISC

Not Applicable

BACKGROUND OF THE INVENTION

1. Field of the Invention

This invention pertains generally to solid-state electrochemical devices, and more particularly to an electrochemical device support structure and an illustrative solid oxide fuel cell with exceptional electrochemical performance.

2. Description of Related Art

Solid-state electrochemical devices are becoming increasingly important for a variety of applications including energy generation, oxygen separation, hydrogen separation, coal gasification, and the selective oxidation of hydrocarbons. Fuel cells, for example, hold the promise of an efficient, combustion-less, low pollution technology for generating electricity. Because there is no combustion of fuel involved in the process, fuel cells do not create any of the pollutants that are commonly produced in conventional electricity generation by boilers or furnaces and steam driven turbines. Indeed, water, heat and electricity are the only products of fuel cell systems designed to use hydrogen gas.

Solid-state electrochemical devices are normally cells that include two porous electrodes, the anode and the cathode, and a dense solid electrolyte membrane disposed between the electrodes. In the case of a typical solid oxide fuel cell (SOFC), the anode is exposed to fuel and the cathode is exposed to an oxidant in separate closed systems to avoid any mixing of the fuel and oxidants due to the exothermic reactions that can take place with hydrogen fuel. The electrolyte membrane is normally composed of a ceramic oxygen ion conductor in solid oxide fuel cell applications. The porous anode may be a layer of a ceramic, a metal or, most commonly, a ceramic-metal composite ("cermet") that is in contact with the electrolyte membrane on the fuel side of the cell. The porous cathode is typically a layer of a mixed ionically and electronically-conductive (MIEC) metal oxide on the oxidant side of the cell.

In implementations such as fuel cells and oxygen and syn-gas ($H_2$+CO) generators, the solid membrane is normally an electrolyte composed of a material capable of conducting an ionic species, such as oxygen or hydrogen ions, yet has a low electronic conductivity. In other implementations, such as gas separation devices, the solid membrane is composed of a mixed ionic electronic conducting material ("MIEC"). In either case, the electrolyte/membrane must be dense and pinhole free ("gas-tight") to prevent mixing of the electrochemical reactants. In all of these devices a lower total internal resistance of the cell improves performance.

Electricity is generated in a fuel cell through the electrochemical reaction that occurs between a fuel (typically hydrogen produced from reformed methane) and an oxidant (typically air). This net electrochemical reaction involves charge transfer steps that occur at the interface between the ionically-conductive electrolyte membrane, the electronically-conductive electrode and the vapor phase of the fuel or oxygen.

For example, in the operation of a typical solid oxide fuel cell, a fuel such as hydrogen, methane or carbon monoxide is cycled through the anode side of the cell and the fuel reacts with oxide ions ($O^{-2}$) from the electrolyte. Examples of possible reactions at the anode that can occur in this setting, depending on the fuel used, are as follows:

$$H_2 + O^{-2} \rightarrow H_2O + 2e^-$$

$$CO + O^{-2} \rightarrow CO_2 + 2e^-$$

$$CH_4 + 4O^{-2} \rightarrow 2H_2O + CO_2 + 8e^-$$

The electrons produced in the electrochemical reactions are deposited with the anode and drawn out of the system. At the cathode, electrons are received by oxygen atoms from the air and converted into oxide ions that are transferred to the electrolyte with the reaction $O_2 + 4e^- \rightarrow 2O^{-2}$ and the cycle continues.

Solid oxide fuel cells normally operate at temperatures between about 900° C. and about 1000° C. The operating temperature of a fuel cell, for example, may be influenced by a number of factors primarily related to reaction efficiency. The principal consideration governing the temperature at which a solid oxide fuel cell or any solid-state electrochemical device is operated is the ionic conductivity of the electrolyte membrane. At appropriate temperatures the oxygen ions easily migrate through the crystal lattice of the electrolyte. Therefore, conventional fuel cells must be operated at a high enough temperature to make the ceramic electrolyte sufficiently ionically conductive for the energy producing reactions to occur efficiently. Other operating temperatures may be used to maximize other reactions for use in gas separators or gas generators.

Another consideration in the determination of operation temperature is the type of fuel used and fuel efficiency. For example, methane is plentiful, inexpensive, and rich in hydrogen, the preferred fuel for the cell. Methane and other hydrocarbons may be reformed to produce hydrogen at a temperature of about 650-950° C. Therefore, it is usually desirable to operate a solid oxide fuel cell at least at the lower end of this temperature range. Waste heat from the fuel cell may be used directly in the reformer to pre-treat the fuel before it enters the fuel cell. Waste heat may also be used to generate steam to drive a generator or the like and improve the overall production efficiency of the system.

Unfortunately, most metals are not stable at the high operating temperatures and oxidizing environment of conventional fuel cells and become converted very quickly to brittle oxides. In solid oxide fuel cells, component durability is most problematic at the air electrode where oxidation can take place. In other solid-state electrochemical devices, such as oxygen generators, both electrodes may be in an oxidizing environment during operation of the device, and so both may face this problem. Accordingly, solid-state electrochemical devices have conventionally been constructed of heat-tolerant ceramic materials, such as $La_{1-x}Sr_xMn_yO_{3-\delta}$ ($1 \geq X \geq 0.05$) ($0.95 \leq y \leq 1.15$) ("LSM"), and yttria stabilized zirconia (e.g., $(ZrO_2)_{0.92}(Y_2O_3)_{0.08}$) ("YSZ"). These materials tend to be expensive and still have a limited life in high temperature and high oxidation conditions.

In addition, the thickness of the solid electrolyte, typically hundreds of microns thick, requires an operating temperature above 900° C. to achieve an acceptable ionic conductivity. However, it has also been observed that the resistance of electrolyte layers that are deposited as very thin films is very low at intermediate temperatures ranging between 500° C. and 800° C. Intermediate operational temperatures will allow the use of comparatively less expensive materials to construct the cell and lower the thermal energy requirements.

Several methods exist for forming thin film electrolytes on ceramic substrates, such as sputtering, tape calendaring, sol-gel deposition and physical vapor deposition techniques. For example, plasma spray deposition of molten electrolyte material on porous device substrates has been proposed, however these plasma sprayed layers are still sufficiently thick (reportedly 30-50 microns) to substantially impact electrolyte conductance and therefore device operating temperature. Furthermore, many of these application methods are complex and expensive techniques and the high operating costs as well as the cost of production equipment present a significant barrier to commercialization.

Electrochemical cells with ceramic electrodes and electrolytes in the art have two basic designs: tubular and planar. Tubular designs have traditionally been more easily implemented than planar designs, and thus have been proposed for commercial applications. However, tubular designs provide less power density than planar designs due to the relatively long current path that results in a substantial resistive power loss that is inherent in the design.

Planar fuel cell designs are theoretically more efficient than tubular designs, but are generally recognized as having significant safety and reliability issues due to the complexity of sealing and manifolding a planar stack. To be stacked, the fuel cells require bipolar interconnects adjacent to each electrode that are electrically, but not ionically, conductive. The interconnects allow current generated in the cells to flow between cells and to be collected for use. These interconnects are typically formed into manifolds through which fuel and air may be supplied to the respective electrodes. Due to the highly exothermic combustion resulting from an uncontrolled mixture of hydrogen and oxygen, it is essential that the interconnect manifolds be well sealed at all edges of the planar cell. Moreover, due to required operating temperatures in excess of 900° C. for conventional devices, the interconnect in contact with the air electrode may not be made of metal due to the occurrence of high temperature corrosion.

Prior designs for solid-state electrochemical planar stack devices have used ceramic materials such as lanthanum chromite to form the interconnects. However, lanthanum chromite is a very expensive material, sometimes accounting for as much as 90% of the cost of a device. In addition, it is a relatively brittle material compared to metals and therefore less than ideal for an application requiring an absolute seal. Lanthanum chromite and similar materials are also significantly less conductive than metal, resulting in resistive losses that reduce the overall efficiency of the fuel cell device. These problems have combined to make current planar stack implementations impractical for commercial applications.

Thus, present solid-state electrochemical devices incorporating conventional designs are expensive to manufacture and may suffer from safety, reliability, and/or efficiency drawbacks. Consequently, the cost of electrical energy production from fuel cells is several times higher than the cost of the same electrical production from fossil fuels.

Accordingly, there is a need to provide electrochemical devices such as solid oxide fuel cells that are capable of operating efficiently at lower temperatures and use less expensive materials and production techniques. A method for reducing the cost of materials and manufacturing while increasing the reliability of solid state electrochemical devices would be of great benefit and, for example, might allow for the commercialization of such devices that have been previously too expensive, inefficient or unreliable to exploit. The present invention satisfies these needs, as well as others, and generally overcomes the deficiencies in conventional devices.

BRIEF SUMMARY OF THE INVENTION

An apparatus and method of manufacture are provided for an electrochemical device that is supported by at least one porous support sheet that can operate at lower operating temperatures and has improved fuel efficiency over the art. By way of example, and not of limitation, in accordance with one aspect of the invention a solid state electrochemical device is provided that has a porous metal or porous metal alloy layer bonded to an electrochemical device layer. The metal support layer may be wire mesh, perforated metal sheets or sintered porous metal powder sheets.

According to another aspect of the invention, the electrochemical device layer has a first electrode layer and an electrolyte layer that is at least 90% dense. A second electrode layer may also be applied. The electrodes and electrolytes are preferably applied as thin films ranging in thickness from around 1-500 μm. However, electrolyte layers ranging in thickness of between approximately 10 μm to approximately 20 μm and electrodes ranging in thickness from approximately 50 μm to approximately 150 μm are preferred.

In accordance with another aspect of the invention, a solid state electrochemical device is provided that has a porous metal layer, a bonding layer and a plurality of electrochemical device layers bonded to the porous metal layer and positioned substantially planar to each other in an array.

According to another aspect of the invention, a solid state electrochemical device is provided that has a first porous layer bonded to the anode of the electrochemical device with a first bonding layer and a second porous layer bonded to the cathode of the electrochemical device with a second bonding layer.

A further aspect of the invention is providing a stack of interconnected planar arrays.

According to another aspect of the invention a method for producing an electrochemical cell by providing a porous metal layer and bonding an electrochemical device layer onto the porous metal layer. In one embodiment the bonding is accomplished by applying a bonding layer between the porous metal layer and the electrochemical device layer, positioning the electrochemical device layer on the porous metal layer, and firing at a time and temperature sufficient for bonding to occur.

Another aspect of the invention is to provide a method for producing an electrochemical cell with the use of thin films to produce an electrolyte layer sandwiched between the first and second electrode layers to reduce the operating temperature and increase the operating efficiency. In one embodiment the electrolyte is a thin film (1-100 μm) electrolyte supported by a thicker porous structure such as a porous $La_{1-x}Sr_xMn_yO_3$ (LSM) or Ni—YSZ (Nickel-Yttria Stabilized Zirconia) or a stainless steel alloy support.

In one fuel cell embodiment, an electrochemical device is provided with at least one electrode layer and an electrolyte layer that is gas impermeable (preferably greater than approximately 90% dense.) The electrochemical device is bonded to a porous metal or metal alloy layer with a bonding layer or weld. The metal or metal alloy can be in the form of a perforated sheet, wire mesh, or sintered porous powder. A second electrode and/or a current collecting or layer may also be included as part of the cell. The device may have a porous support different than the electrode layer, for example, an LSM support/LSM-YSZ electrode/YSZ electrolyte/Ni—YSZ electrode or for example a FeCr support/Ni—YSZ electrode/YSZ electrolyte. In another embodiment, a number of pre-processed electrochemical devices are bonded to a porous support layer such as a perforated metal sheet to create a planar array of units. The perforated sheet is part of an enclosed manifold that delivers fuel to the unit cell in one embodiment.

In another embodiment, interconnect layers are placed between the anode and cathode layers of adjacent cells to provide electrical connection from cell to cell and to serve as a barrier between the cells to prevent the migration of fuel or oxidant between the cells.

An object of the invention is to provide an electrochemical device with thin films of electrolyte and electrode layers on a porous metal support.

Another object of the invention is to provide a solid oxide fuel cell that has an operating temperature of less than approximately 800° C.

Another object of the invention is to provide an electrochemical cell that is durable, reliable and is inexpensive to manufacture.

Still another object of the invention is to provide a method for manufacturing a solid oxide fuel cell that can be safely placed in a planar array.

A further object of the invention is to provide an array of electrochemical devices that is configured to avoid a failure of the array upon failure of a single electrochemical device in the array.

Another object of the invention is to provide an array of electrochemical devices that can be organized into stacks of planar arrays.

Further aspects and objects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWINGS

The invention will be more fully understood by reference to the following drawings which are for illustrative purposes only.

DETAILED DESCRIPTION OF THE INVENTION

Figure 1:
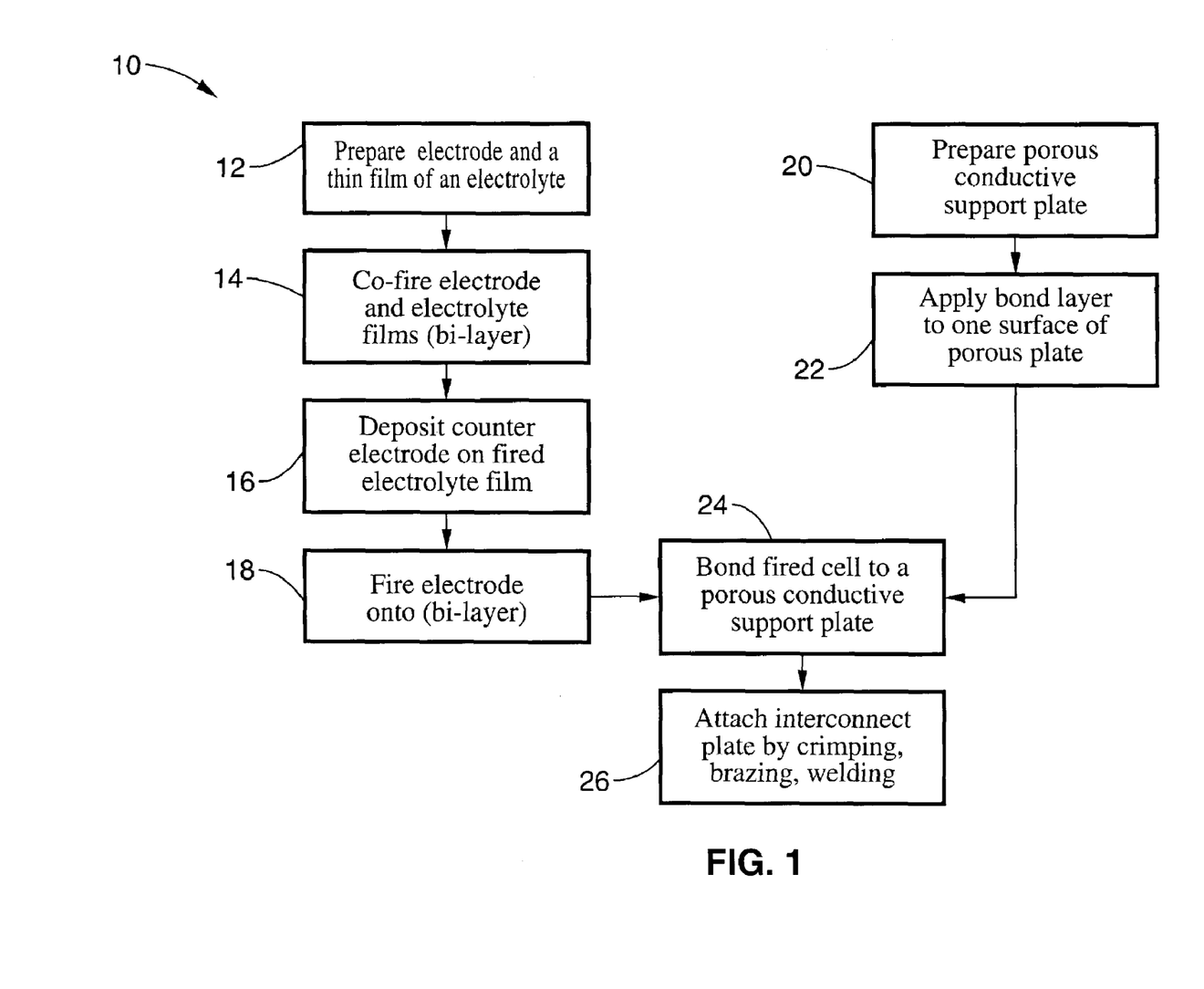
FIG. 1 is a flow diagram of a method of producing a supported electrochemical cell according to the present invention.

Referring more specifically to the drawings, for illustrative purposes the present invention is embodied in the method shown in FIG. 1 and the devices generally shown in FIG. 2 through FIG. 8. It will be appreciated that the apparatus may vary as to configuration and as to details of the parts, and that the method may vary as to the specific steps and sequence, without departing from the basic concepts as disclosed herein.

Referring first to FIG. 1, an embodiment of a method of fabricating an electrochemical device assembly according to the present invention will now be described. In the embodiment that will be described, a fuel cell will be used as an exemplary electrochemical device. It will be appreciated, however, that other types of electrochemical devices can be fabricated in accordance with method of the present invention.

In the method illustrated in FIG. 1, a prefabricated electrochemical device is bonded to a porous electrically conductive support plate by means of a bonding layer interposed between the electrochemical device and the support plate. Each of these elements establish layers in a device assembly or unit cell; that is, the basic unit cell comprises an assembly of an electrochemical device layer, a bonding layer, and a support plate layer.

In FIG. 1, the prefabricated electrochemical device is produced at block 12 through block 18. The electrochemical device generally comprises an electrolyte layer disposed between electrode layers that form an anode and a cathode, and the process for fabricating the electrochemical device proceeds generally as follows.

First, at block 12, a thin film of an electrolyte and a thin film of an electrode material are prepared. Ionic and mixed-conducting ceramic devices such as solid-oxide fuel cells, gas separation membranes, and membrane reactors require a dense electrolytes and highly porous electrodes. In addition to oxygen-ion conducting electrolytes such as ceria and zirconia films, other ion conducting electrolytes such as proton conducting films and mixed ionic-electronic conducting films can be applied in the alternative.

It has been shown that the operating temperature of an electrochemical cell can be reduced with the use of thin film ceramic electrolytes and electrodes because of the reduction of ohmic losses across ionic and ionic-electric conducting materials deposited as thin films.

Several approaches to thin film fabrication are known in the art including physical vapor deposition techniques, tape calendaring, sol-gel deposition, sputtering and colloidal deposition. While there are many methods of creating thin films, it is preferred that the films be deposited using a colloidal deposition method. In this embodiment, the electrolyte material is generally prepared as a suspension of the powder material in a liquid media, such as water, isopropanol, and other suitable organic solvents. The suspension may be applied to a surface of an electrode layer by a variety of methods; for example, by aerosol spray, dip coating, electrophoretic deposition, vacuum infiltration, or tape casting. Typically, green films of the desired oxide are colloidally deposited onto green or partially fired substrates. In addition, the film should be well bonded to the surface of the substrate without excessive infiltration into the porosity of the electrode and there should be minimal polarization at the interface between the electrolyte and electrode.

The colloidal process is preferred because it is inexpensive and scaleable, and can produce devices with high performance at reduced temperatures. However, colloidal deposition of dense electrolyte layers on porous substrates requires that the materials be chemically compatible at the processing temperature and there must be an adequate thermal expansion match between the layers.

A pinhole and crack free dense layer of electrolyte ranging from approximately 1 µm to approximately 50 µm in thickness on electrode substrates of high porosity and suitable microstructure to ensure low overpotential during device operation are generally preferred. For typical fuel cell applications, an electrolyte layer ranging from approximately 10 µm to approximately 20 µm in thickness is preferred.

The electrolyte material is preferably composed of a thin layer of a metal oxide (ceramic) powder, such as yttria stabilized zirconia (YSZ) (e.g., $(ZrO_2)_x(Y_2O_3)_y$ where $(0.88 \geq X \geq 0.97)$ and $(0.03 \leq y \leq 0.12)$. The preferred material is $(ZrO_2)_{0.92}(Y_2O_3)_{0.08}$ or $(ZrO_2)_{0.90}(Y_2O_3)_{0.10}$ that are available commercially. Other possible electrolyte materials include $(ZrO_2)_{0.9}(Sc_2O_3)_{0.1}$ scandia stabilized zirconia (SSZ), $(CeO_2)_{0.8}(Gd_2O_3)_{0.2}$ (CGO), $La_{0.8}Sr_{0.2}Ga_{0.85}Mg_{0.15}O_{2.825}$ (LSGM20-15) and $(Bi_2O_3)_{0.75}(Y_2O_3)_{0.25}$. Alternatively, the electrolyte material may be a mixed ionic electronic conductor, for example $SrCo_{1-x}Fe_xO_{3-\delta}$ $(0.30 \geq X \geq 0.20)$, $La_{0.6}Sr_{0.4}Co_{0.6}Fe_{0.4}O_{3-\delta}$, $Sm_{0.5}Sr_{0.5}CoO_3$ and $La_{1-x}Sr_xCoO_{3-\delta}$. Such structures may find use in oxygen separation devices, for example, as described herein.

Electrode and electrolyte materials may be matched and the thickness of the applied materials may be selected based on the thermal expansion, electronic conductivity and ionic conductivity characteristics of the electrode and electrolyte materials. In addition, the thickness of the film of electrolyte may depend the ability of the electrolyte material to be gas impermeable and maintain its mechanical integrity e.g. resist cracking when exposed to a range of operating and rest temperatures.

Each electrode preferably comprises a porous layer of electrocatalyst material. In such electrodes, the electrocatalyst material is preferably semi-continuous on the surface of the porous electrolyte material to create a three-phase boundary (TPB) where the electrolyte material, electrocatalyst, and gas are in contact. However, it will be understood that other solid-state electrochemical device electrodes may also be used.

Suitable electrode materials in accordance with the present invention also include cermets and ceramics. For example, other suitable ceramic components include: $La_{1-x}Sr_xMn_yO_{3-\delta}$ $(1 \geq X \geq 0.05)$ $(0.95 \leq y \leq 1.15)$ ("LSM"), $La_{1-x}Sr_xCoO_{3-\delta}$ $(1 \geq X \geq 0.10)$ ($\delta$ is defined as that value signifying a small deviation from perfect stoichiometry) ("LSC"), $SrCo_{1-x}Fe_xO_{3-\delta}$ $(0.30 \geq X \geq 0.20)$, $La_{0.6}Sr_{0.4}Co_{0.6}Fe_{0.4}O_{3-\delta}$, $Sr_{0.7}Ce_{0.3}MnO_{3-\delta}$, $LaNi_{0.6}Fe_{0.4}O_{3-\delta}$, $Sm_{0.5}Sr_{0.5}CoO_{3-\delta}$, yttria stabilized zirconia (YSZ), scandia stabilized zirconia (SSZ), $(CeO_2)_{0.8}(Gd_2O_3)_{0.2}$ (CGO), $La_{0.8}Sr_{0.2}Ga_{0.85}Mg_{0.15}O_{2.825}$ (LSGM20-15), $(Bi_2O_3)_{0.75}(Y_2O_3)_{0.25}$ and alumina.

Preferred LSM materials include $La_{0.8}Sr_{0.2}MnO_{3-\delta}$, $La_{0.65}Sr_{0.30}MnO_{3-\delta}$, and $La_{0.45}Sr_{0.55}MnO_{3-\delta}$. Suitable metal components for the cermets are transition metals Cr, Fe, Ag and/or alloys such as low-chromium ferritic steels, such as type 405 and 409 (11-15% Cr), intermediate-chromium ferritic steels, such as type 430 and 434, (16-18% Cr), high-chromium ferritic steels, such as type 442, 446 and E-Brite (19-30% Cr), chrome-based alloys such as Cr5Fe1Y and chrome-containing nickel-based Inconel alloys including Inconel 600 (Ni 76%, Cr 15.5%, Fe 8%, Cu 0.2%, Si 0.2%, Mn 0.5%, and C 0.08%).

The anode electrode is preferably a thin film ranging in thickness from approximately 5 µm to 500 µm. However, electrode layers ranging in thickness of between approximately 50 µm to approximately 150 µm are preferred. The cathode electrode is preferably a thin film ranging in thickness from approximately 10 µm to approximately 500 µm. However, cathode layers ranging in thickness of between approximately 50 µm to approximately 150 µm are preferred. It will be understood that the selected thickness of the electrodes can vary depending on the thermal expansion, electronic conductivity and ionic conductivity characteristics of the electrode and electrolyte materials.

Turning now to block 14 of FIG. 1, the bi-layer formed at block 12 is then co-fired to yield a pinhole free, dense film of electrolyte that is well bonded to the porous structure of the electrode. The sintering behavior of both film and substrate materials should also be considered in the selection of electrolyte and electrode materials. For example, the preferred colloidal deposition technique has been used with great success to produce yttria stabilized zirconia (YSZ) based solid oxide fuel cells. In this embodiment the YSZ electrolyte film is co-fired onto a NiO/YSZ electrode substrate. The thickness of the YSZ film deposited onto the porous substrate is approximately 10 µm after sintering, and is well bonded to the NiO/YSZ electrode. Ni—YSZ/YSZ/LSM cells built with this method have exhibited theoretical open circuit potentials (OCPs), high current densities and exceptionally good power densities of over 1900 mW/cm$^2$ at 800° C. Electrochemical characterization of the cells indicates negligible losses across the Ni—YSZ/YSZ interface and minor polarization of the fuel electrode.

At block 16, the counter electrode material is deposited onto the fired electrolyte electrode film. This second electrode may be deposited by any of the methods used to deposit films described above. However, colloidal deposition of a thin film of the counter electrode material is preferred. The counter electrode may comprise the same material as the first electrode applied at block 12 or may comprise a different material.

It will be appreciated that the first electrode that is applied can either be the anode or the cathode, and that the second electrode will be a counter electrode.

Next, at block 18, the deposited second electrode is fired to the bi-layer produced in steps 12 through 16. Note that, depending on the nature of the selected electrode material, it is often necessary to fire the second electrode at a different temperature than used to give the electrolyte sufficient density to prevent gases from crossing the electrolyte layers or the temperature used to process the first electrode. For example, electrolytes often require exposure to temperatures in the range of approximately 1200° C. to approximately 1500° C. to become sufficiently dense to prohibit fuel or oxidant gases from passing through the electrolyte. An anode composed of NiO—YSZ, for example, is typically sintered between approximately 1250° C. and approximately 1400° C. LSM-YSZ cathodes are typically fired at temperatures between approximately 950° C. and approximately 1250° C.

In an alternative embodiment, the anode and the cathode are fired to the electrolyte at the same time and under the same conditions.

It will be appreciated that the fired anode-electrolyte-cathode films collectively form an electrochemical device that has been prefabricated and produced under conditions that facilitate the union of the electrolyte and electrode materials. An important aspect of the inventive method is that the electrochemical device is prefabricated prior to bonding to the porous conductive support plate.

At block 20 of FIG. 1, the porous conductive support plate is prepared. It will be appreciated that the order of fabrication of the electrochemical device and the support plate is non-limiting. Either may be fabricated first or simultaneously.

The porous conductive support plate may be a perforated metal sheet, sintered powder, a wire mesh or the like. The porous support plate preferably has a thickness within the range from approximately 50 μm to approximately 750 μm, and more preferably within the range of approximately 50 μm to approximately 500 μm.

The support plate is preferably produced from a high-strength commercial metal alloy or metal-ceramic. In one embodiment, the metal alloy is manufactured using the same process that is used to make metal filters that work in high temperature applications. For example, powdered stainless steel is fired in an oxygen-free environment, which creates a porous metal sheet. This stainless steel alloy is much stronger than ceramic, and unlike ceramic, it can be welded, brazed, hammered, and crimp-sealed.

The support plate may comprise porous metals such as the transition metals chromium, silver, copper, iron and nickel, or a porous alloy such as low-chromium ferritic steels, such as type 405 and 409 (11-15% Cr), intermediate-chromium ferritic steels, such as type 430 and 434, (16-18% Cr), high-chromium ferritic steels, such as type 442, 446 and E-Brite (19-30% Cr), chrome-based alloys such as $Cr_5Fe_1Y$ and chrome-containing nickel-based Inconel alloys including Inconel 600 (Ni 76%, Cr 15.5%, Fe 8%, Cu 0.2%, Si 0.2%, Mn 0.5%, and C 0.08%) and the like. In some embodiments, the substrate may be a porous non-nickel cermet incorporating one or more of the transition metals Cr, Fe, Cu and Ag, or alloys thereof.

The use of powdered metal may also translate into reduced manufacturing costs and design flexibility. The current cost of stainless steel is approximately $2 per pound, while zirconia is between $30 and $60 per pound. In addition, efficiency loss due to current collection is minimized with the use of alloys and the alloy increases a fuel cell's strength as well as its electronic and thermal conductivity. Although stainless steel metallic porous layers 18 are preferred, other metallic supports such as ceramic-metallic (cermet) supports may be used.

Once the electrochemical device and the support plate are prepared, the bonding layer is applied to the support plate at block 22. It will be appreciated that the bonding layer could alternatively be applied to the electrochemical device, but the bonding layer is preferably applied to the support plate to help reduce potential damage to the electrochemical device. The three layers are then bonded together at block 24 for form a unit cell.

The bonding layer may comprise an interlayer of metal, metal alloy, metal-ceramic, brazing material, or a metallic weld. Preferably, the bonding layer has a thickness ranging from approximately 1 μm to approximately 150 μm, and more preferably within the range of approximately 10 μm to approximately 50 μm.

In one embodiment, the layers are positioned together, with or without applied pressure, and fired at temperatures and times sufficient for bonding (sintering) to occur between the support plate and the electrochemical device. Where oxide forming metals or cermet powders are used, the atmosphere must be sufficiently reducing to enable sintering and/or bonding to occur. The metals may be chromia or alumina-forming iron based alloys. The metal can be Cu, Ag, CuAg AgPd alloys or Ag mixed with a ceramic such as LSM or YSZ or $Al_2O_3$ etc. Brazing compounds joining metals to ceramics such as AgCu, AgTi, AgCuTi, AgCuZr, CuTi, SnCuAg, CuAuNi may also be used as bonding materials. For example, we have successfully fabricated a Ni—YSZ/YSZ electrochemical device bonded to a 430 SS perforated sheet with Fe16Cr4Ni4Cu alloy powder.

Thus it can be seen that the unit cell (electrochemical device assembly) may comprise a porous support, electrodes and electrolytes that are made from different materials and assembled under different conditions. For example, an LSM support/LSM-YSZ electrode/YSZ electrolyte/Ni—YSZ electrode may be produced. Another example would be a FeCr support/Ni—YSZ electrode/YSZ electrolyte.

Optionally, metal components may be modified to increase their resistance to oxidation by surface coating with stable alloy forming metals, such as platinum, silver, or other appropriate metal, alloy or oxide. In addition to providing protection, the protective layer may conduct ions generated during discharge of the negative electrode for example. It is also possible to weld an electrochemical device to the porous metal support thereby eliminating glass, ceramic, or glass-ceramic seals. The welded support could eliminate the need for high temperature bonding.

In an alternative embodiment, a porous conductive support plate may be bonded to the anode of an electrochemical device with a first bonding layer and the cathode bonded to a second porous conductive support plate with a second bonding layer. The resulting assembly is a five layer structure comprising a first support plate, a first bonding layer, an electrochemical device, a second bonding layer, and a second support plate.

Referring further to FIG. 1, at block 26 an interconnect plate can be attached to the porous metal support plate by crimping, brazing or welding and the like. The interconnect plate preferably forms an enclosed channel that will allow fuel or oxidants to flow and permeate the porous support plate and the electrode. In other words, the interconnect plate functions as a gas duct. Unitary electrochemical device assemblies may be arrayed by interconnecting their support plates, or more preferably, electrochemical device cells may be arrayed in groups on a single support plate or stacked to increase the energy capacity of the system. A fuel cell apparatus according to the present invention may comprise a single cell or any suitable plurality of cells arranged in a planar array or in a three-dimensional (stacked) array.

Figure 2A:
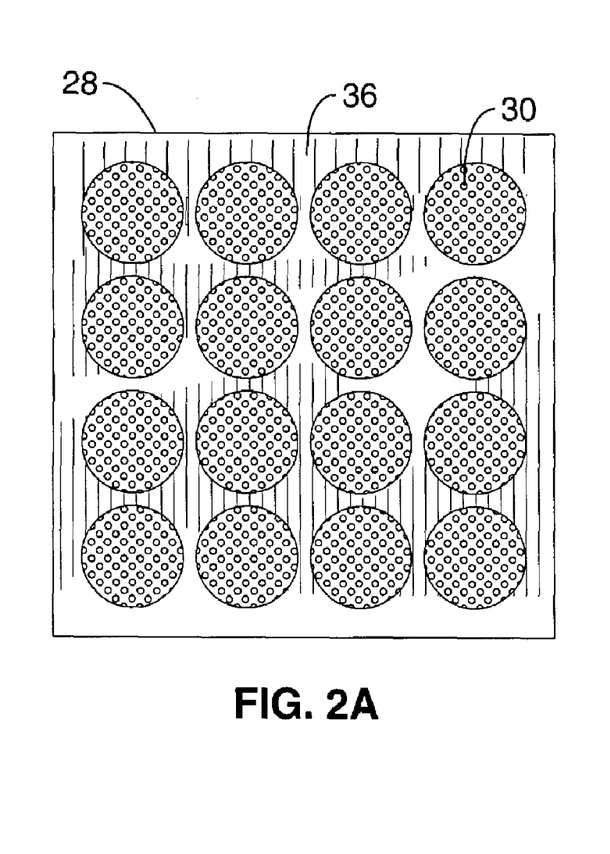
FIG. 2A and FIG. 2B are top views of one embodiment of a planar array of circular electrochemical cells according to the invention.
Figure 2B:
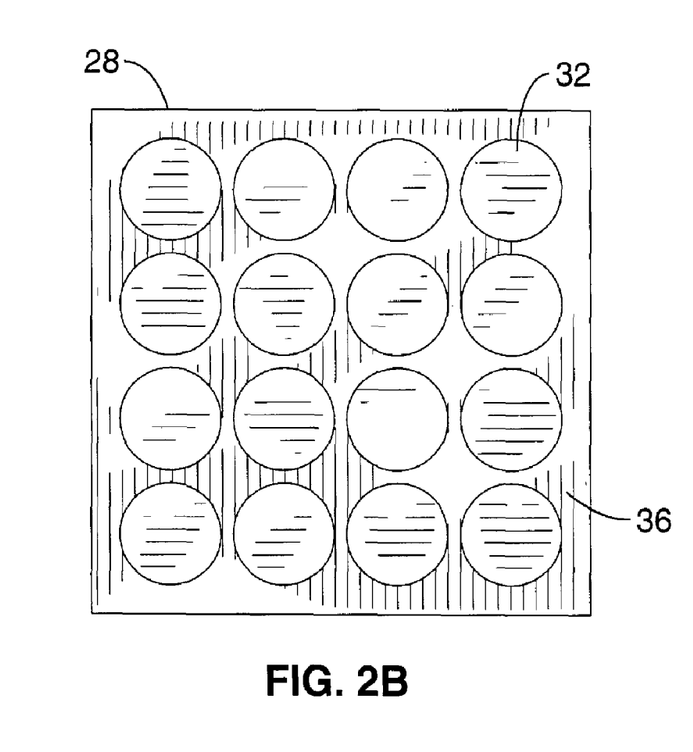
Figure 3A:
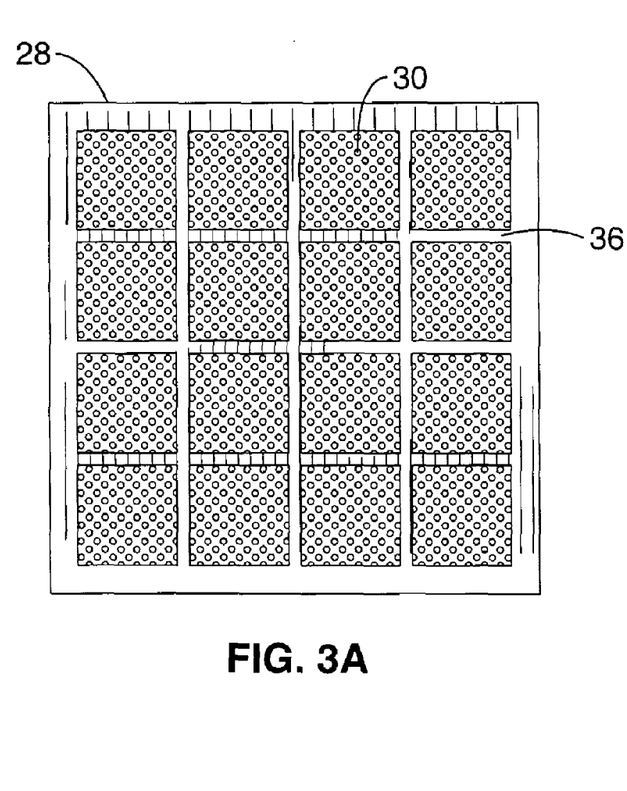
FIG. 3A and FIG. 3B are top views of one embodiment of an array of square electrochemical cells according to the invention.
Figure 3B:
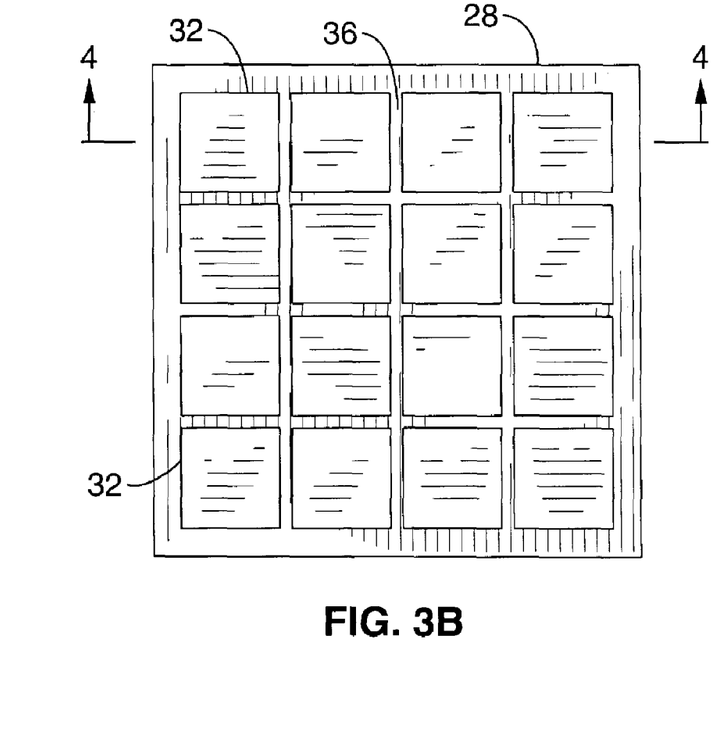

Turning now to FIG. 2 and FIG. 3, one embodiment of a planar array according to the invention can be seen. In FIG. 2B and FIG. 3B, a four-by-four planar array of circular and square electrochemical devices 32 on a single porous metal sheet 28 is depicted. The electrochemical devices are arranged in parallel so that failure of one electrochemical device 32 will not result in the failure of the entire array.

The perforated sheet 28 may be chosen such that the pattern of perforations 30 matches the dimensions of the electrochemical layers 32 as seen in FIG. 2A and FIG. 3A. In this embodiment, plate 28 is a planar metal sheet with circular perforations 30. The distribution of the perforations on plate 28 preferably corresponds to the dimensions of the electrochemical devices 32. Alternatively, the porous conductive sheet 28 may be uniformly porous and be perforated with holes of various diameters or may have channels rather than holes.

Referring also to FIG. 2B and FIG. 3B, it can be seen that the electrochemical device layers can be manufactured separately from the manufacture of the porous support sheet, thereby enabling a plurality of small prefabricated electrochemical devices to be bonded to a single large perforated sheet in a planar array. To do so, the electrodes (e.g., all anodes or all cathodes) of each of the electrochemical devices 32 would be positioned over corresponding perforations 30 in the support plate 28 and bonded to the support plate with a bonding layer in the manner described above. Once the electrochemical devices are bonded to the support plate, the edges of each of the electrochemical device units would then be sealed by a ceramic or glass, glass-ceramic, cermet paste or like material, or a braze or weld. Arrays of supported thin film electrochemical devices 32 can be created in this manner without the need to make very flat plates 28 with high tolerances and without the need to use plates larger than 5 cm to 20 cm in width. The dimensions can vary because edge sealing of each electrochemical device 32 to plate 28 will not require high dimensional tolerances.

Figure 4:
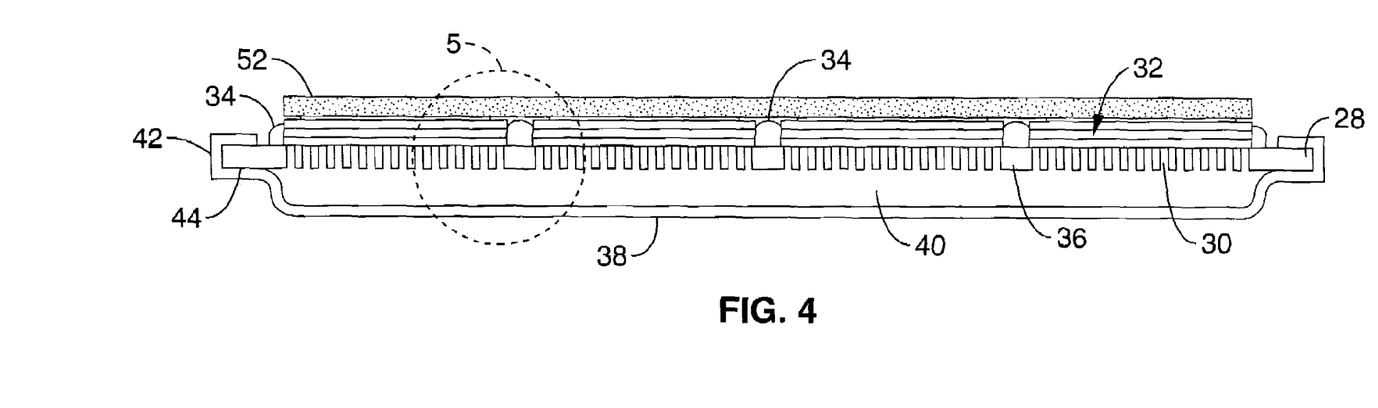
FIG. 4 is a cross-sectional view of the embodiment taken along the lines 4-4 shown in FIG. 3B.

FIG. 4 illustrates a cross-section of one embodiment of the planar array shown in FIG. 3B. As can be seen in FIG. 4, four electrochemical devices 32 across have been bonded to the porous plate 28 and positioned over perforations 30. Sealant 34, such as ceramic, cermet, glass, glass-ceramic, brazing alloys and like materials are used to bond and seal the electrochemical devices 32 into position. In the embodiment shown, sealant 34 is positioned on sealing areas 36 of support plate 28. Sealing areas 36 are areas of support plate 28 without perforations that provide stability to the support plate and a firm area to bond and seal the edges of electrochemical devices 32 to support plate 28.

Note from FIG. 4 that support plate 28 can be affixed to an interconnecting metal box or duct 38 to provide a channel or passageway 40 that can receive fuel or oxidant gases. The interconnecting duct 38 forming the passageway 40 is shown having sealing edges 42 which attach to support plate 28 with a preferably gas tight seal 44. Sealing edges 42 can be sealed with a compression seal, a crimp seal, welds or brazes, or other sealing means to provide gas tight a gas passageway 40. Passageway 40 can be configured to different volumes and can provide different gas pressures and gas flows at the perforations 30 of plate 28 and therefore at the anode interface.

Figure 5:
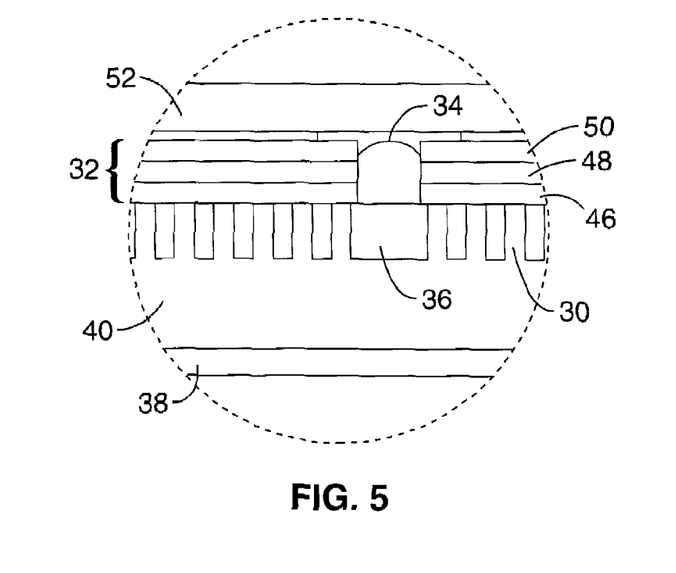
FIG. 5 is a detailed sectional view of the planar array cross section shown in FIG. 4.

Referring now to FIG. 5, a detailed section of electrochemical device 32 bonded to support plate 28 can be seen. In the embodiment shown, electrochemical device 32 has an anode layer 46, an electrolyte layer 48 and a cathode layer 50. Electrochemical device 32 is bonded to plate 28 with a sealant 34 that seals the edges of the electrochemical device and the porous support plate 28.

In use, gaseous fuel would be cycled into passageway 40 of the interconnecting duct 38 of the array and through perforations 30 of support plate 28 to anode layer 46. Negatively charged oxygen ions, for example, migrate through the electrolyte and react with hydrogen ultimately producing electrons that flow through the anode to an external load and a portion of the generated electrons return back to the cathode.

Note also that the embodiment shown in FIG. 4 has a cathode configuration that is open to the ambient air. In this embodiment, cathodes 50 of electrochemical cells 32 may have a wire mesh or felt current collector 52 that covers the array. In the current collection scheme of this embodiment, it is thereby possible to collect current at the edges of the flat plate 28 rather than perpendicular to the plane of the electrochemical device layer 32 of the apparatus. In an alternative embodiment, a support plate would be bonded to the cathodes of the electrochemical devices and a duct connected to the support plate as described above with respect to the anode. Alternatively, the duct could be bonded to the wire mesh or porous felt collector layer if one is used. These approaches would allow for oxidant flow to provide a closed system.

It will be appreciated that the single plate embodiment shown in FIG. 4 can also be stacked in vertical stacks to create a three-dimensional array, or support plates can be interconnected in a series connection to increase capacity. Stacking the cells anode to cathode can increase the total amount of energy that is produced by a solid-state fuel cell. Interconnect layers may be placed between the anode and cathode layers of adjacent cells to provide an electrical connection from cell to cell and to serve as a barrier between the cells to prevent the migration of fuel or oxidant between the electrodes.

Figure 6:
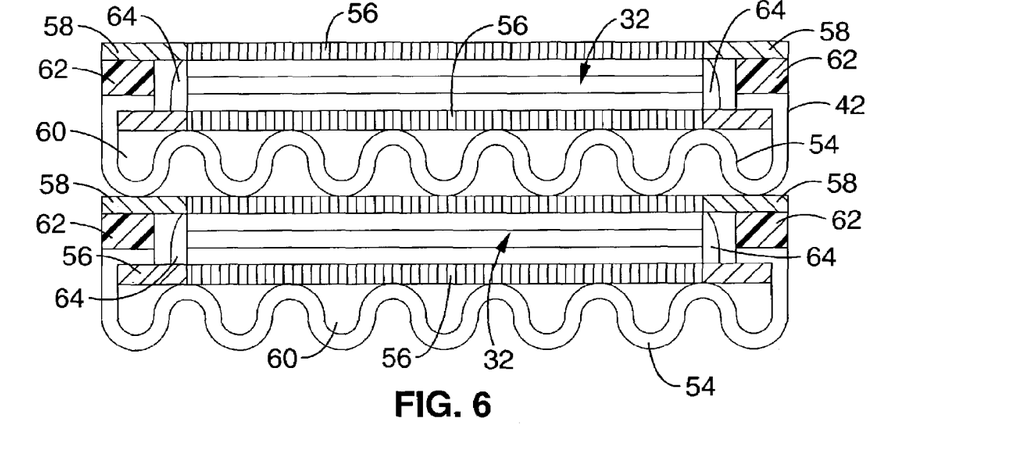
FIG. 6 is a schematic cross-sectional view of two stacked unit cells and corrugated interconnect according to the invention.

For example, to facilitate stacking, duct 38 would preferably be replaced with a corrugated manifold such as manifold 54 as shown in the stacked single unit cell embodiment of FIG. 6. By changing the shape of duct 38 to a corrugated shape and retaining the sealing edges 42 shown in FIG. 4 (also see FIG. 6), it will be appreciated that a plurality of planar arrays can be vertically stacked. For stacking, the corrugated duct would be spot-welded or otherwise bonded to the wire mesh or felt layer 52 of an adjacent planar array. More preferably, wire mesh or felt layer 52 would replaced with a perforated support plate similar to support plate 28 and the sealing edges of the corrugated duct would be attached to the edge of the second support plate in the manner shown in FIG. 4 with regard to support plate 28 and duct 38.

Referring more particularly to FIG. 6, a stack of electrochemical unit cells is shown. In this embodiment, one electrode of electrochemical device 32 is bonded to a porous support 56 and the other electrode is bonded to a second porous support 58. Corrugated duct 54 is preferably sealed to porous support 56 to make a gas tight seal and form an interior passageway 60 to facilitate the flow of fuel to the anode. An electronically insulating gasket 62 preferably separates the sealed edge 42 of the manifold duct 54 from the top porous support 58. The edges of the electrochemical device 32 are preferably sealed with a sealant 64 such as described previously with respect to sealant 34 shown in FIG. 4 and FIG. 5. The single unit cells may be stacked such that the interconnect duct 54 is in contact with the top or cathode support plate 58 of the adjacent cell. Although single unit cells are used as an illustration, it will be understood that multiple unit cells such as shown in FIG. 4 can be stacked.

Figure 7:
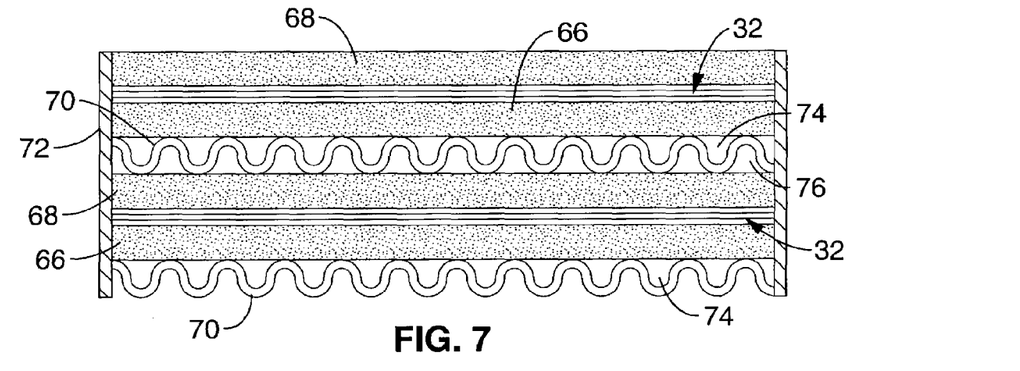
FIG. 7 is a schematic cross-sectional view of an alternative embodiment of the invention showing two stacked unit cells and corrugated interconnect.
Figure 8:
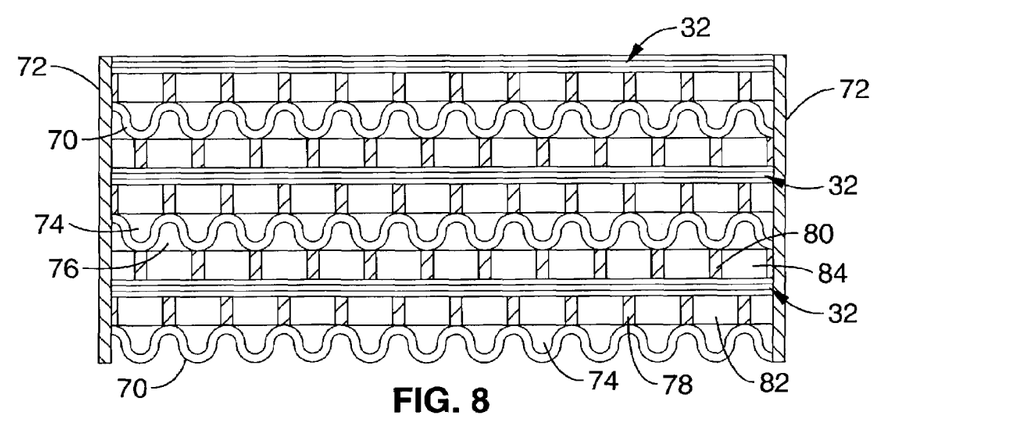
FIG. 8 is a schematic cross-sectional view of an alternative embodiment of the invention showing three stacked unit cells and corrugated interconnect.

FIG. 7 and FIG. 8 illustrate alternative examples of vertically stacked unit cell configurations. In the embodiment shown schematically in FIG. 7, two electrochemical device assemblies are shown in a stacked configuration. In this embodiment, each electrochemical device 32 is interposed between, and bonded to, porous conductive support layers 66, 68. These support layers may be a metallic support, a ceramic-metallic (cermet) support, a perforated sheet, wire mesh or sintered metal powder as described above. Bonding may be facilitated though the use of a bonding interlayer that comprises metal, metal alloy or cermet, or a brazing material or by welding as also described above. For example, a metal, cermet or brazing powder may be applied to the porous support or to the electrochemical device, or both, and then sintered to join the porous support the electrochemical device. FIG. 7 schematically illustrates supports fabricated from sintered porous metal powder or the like.

In FIG. 7, an electrochemical device 32 is supported by a first porous powder support sheet 66 that is bonded to the anode with a first bonding layer (not shown) and a second porous powder support 68 is bonded to the cathode of electrochemical device 32 with a second bonding layer (not shown). Corrugated interconnect manifolds 70 are mounted to the porous support layers 66,68. The preferably non-electrically or non-ionically conducting sides 72 of the manifolds 70 and the electrochemical devices 32 in the array are sealed with a gas tight seal so that there is no escaping fuel that can mix with the oxidant through any of the layers of the apparatus.

As can be seen, manifolds 70 define two distinct spaces or ducts. The first duct 74 communicates with the bottom porous sheet 66 and the anode of the supported electrochemical device 32. The second duct 76 is contiguous with the top porous support sheet 68 of the cathode of the adjacent electrochemical device. It can be seen that fuel can be cycled through duct 74 of manifold 70, thereby providing fuel to the porous anode of electrochemical device 32. Duct 76 of manifold 70 can cycle air or other oxidants through the duct and porous sheet 68 to the cathode of the adjacent electrochemical device 32.

The embodiment of the invention shown schematically in FIG. 8 has a three-tiered stack. In this embodiment electrochemical devices 32 are disposed between a first perforated metal plate 78 bonded to the anode and a second perforated metal plate 80 bonded to the cathode of electrochemical device 32. Interconnecting ducts 70 provides channels 74 for fuel to flow through to the perforations 82 of the first perforated plate 78 and to the anode of electrochemical device 32. Likewise, oxidants can flow through channel 76 and the perforations 84 of the second perforated sheet 80 to the cathode of the adjacent cell.

It will be appreciated that electrochemical devices having a gas tight electrolyte layer sandwiched between porous anode and cathode layers may also be used as an electrolytic device rather than a fuel cell. For example, rather than generating electrical energy out of the device, energy is provided to the device. As a potential is applied across the two electrodes, ions form from gas (e.g., oxygen ions from air) at the cathode and migrate through the electrolyte, which has been selected for its conductivity of ions of a desired pure gas, to produce pure gas (e.g., oxygen) at the anode. In this embodiment, electrolyte may be composed of a solely ionic conducting material, such as yttria-stabilized zirconia (YSZ).

Similarly, if the electrolyte is a proton conducting thin film (for example, doped $BaCeO_3$, doped $SrCeO_3$ or doped $SrZrO_3$) instead of an oxygen ion conductor, the device could be used to separate hydrogen from a feed gas containing hydrogen mixed with other impurities, for instance resulting from the steam reformation of methane ($CH_4$+ $H_2O=3H_2+CO$). Protons (hydrogen ions) formed from the $H_2/CO$ mixture at one electrode/thin film interface could migrate across the thin film driven by a potential applied across the electrodes to produce high purity hydrogen at the other electrode. Thus, this embodiment of the device may operate as a gas generator/purifier.

Likewise, the device could also function as an electrochemical syn gas generator. Syn gas ($H_2$+CO) is a valuable product used for synthesis of higher value organic compounds. The gas is typically produced by the partial oxidation of methane with pure oxygen. Since the pure oxygen must be separated from air in a separate process, syn gas production is relatively expensive. In this embodiment, the feed to the fuel electrode is methane, and air is supplied to cathode, as with the fuel cell. However, the device is run at a current density where methane is only partially oxidized to $H_2$ and CO, as opposed to deep oxidation in typical fuel cell operation to produce $H_2O$ and $CO_2$.

Alternatively, if the solely ionically conducting electrolyte is replaced with a mixed ionic electronic conducting (MIEC) membrane, such as LSC, and instead of applying a potential across the electrodes, air at high pressure is provided on one side of the electrolyte membrane, oxygen ions formed from the air at the membrane will migrate through the membrane to produce pure oxygen at the other side of the membrane. Thus the device may operate as an oxygen gas separator. The electrodes may be composed of one or more materials classified as electronic and/or MIEC and an ionic conductor or MIEC.

Other non-limiting examples within the scope of the present invention include operating the electrode/electrolyte/electrode structure as an oxygen separation or catalytic reactor using an LSM-YSZ/YSZ/LSM-YSZ structure. A LSM-YSZ/YSZ/NiO—YSZ structure may also be used for a solid oxide fuel cell. A NiO—SrZrO/SrZrO/NiO—SrZrO structure would be used for hydrogen separation or catalytic reactors. A NiO—SrZrO/SrZrO/LSM-SrZrO structure would be used for solid oxide fuel cells. An Ag—$Bi_2O_3$/ $Bi_2O_3$/Ag—$Bi_2O_3$ structure would be used for oxygen separation or catalytic reactors.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An electrochemical device assembly, comprising:
a first porous electrically conductive support layer;
a prefabricated electrochemical device layer; and
a first electronically conductive bonding layer between the first support layer and the electrochemical device layer;
a second porous electrically conductive support layer bonded to the electrochemical device layer, wherein the electrochemical device layer is positioned between the support layers;
a second bonding layer between the second porous layer and the electrochemical device, wherein the second bonding layer comprises $Ag_{0.6}Cu_{0.4}Ti_{0.01}$.

2. An electrochemical device assembly as recited in claim 1, wherein the first support layer comprises a material selected from the group consisting essentially of a porous metal alloy, a wire mesh, a sintered porous metallic powder, and a perforated metallic sheet.

3. An electrochemical device assembly as recited in claim 2, wherein the porous metallic powder comprises a material selected from the group consisting of powdered metal, metal-ceramic, and FeCr.

4. An electrochemical device assembly as recited in claim 1, wherein the first bonding layer comprises a metal selected from the group consisting of a metal alloy, a metal-ceramic material, a brazing material, and an Ag compound.

5. An electrochemical device assembly as recited in claim 4, wherein the Ag compound comprises $Ag_{0.6}Cu_{0.4}Ti_{0.01}$.

6. An electrochemical device assembly as recited in claim 1, wherein the second support layer comprises a material selected from the group consisting of a porous metal alloy, a wire mesh, a sintered porous metallic powder, and a perforated metallic sheet.

7. An electrochemical device assembly as recited in claim 6, wherein the porous metallic powder comprises a material selected from the group consisting of powdered metal, metal-ceramic, and FeCr.

8. An electrochemical device assembly as recited in claim 1, wherein the electrochemical device layer comprises a first electrode layer, a second electrode layer, and an electrolyte layer positioned between the electrode layers that is at least 90% dense.

9. An electrochemical device assembly as recited in claim 1, further comprising: a gas duct sealably connected to the porous support layer.

10. An electrochemical device assembly as recited in claim 9, wherein the gas duct is sealably connected to the porous support layer using a seal selected from the group consisting of compression seals, crimp seals, welds and brazes.

11. An electrochemical device assembly as recited in claim 1, further comprising: a first gas duct sealably connected to the first porous support layer; and a second gas duct sealably connected to the second porous support layer.

12. An electrochemical device assembly as recited in claim 11, wherein the first gas duct and the second gas duct are sealably connected to the porous support layers using a seal selected from the group consisting of compression seals, crimp seals, welds and brazes.

* * * * *